(12) United States Patent
Okada

(10) Patent No.: US 12,431,946 B2
(45) Date of Patent: Sep. 30, 2025

(54) WIRELESS COMMUNICATION DEVICE AND WIRELESS COMMUNICATION METHOD

(71) Applicant: Tokyo Institute of Technology, Tokyo (JP)

(72) Inventor: Kenichi Okada, Tokyo (JP)

(73) Assignee: Institute of Science Tokyo, Tokyo (JP)

( * ) Notice: Subject to any disclaimer, the term of this patent is extended or adjusted under 35 U.S.C. 154(b) by 121 days.

(21) Appl. No.: 18/567,711

(22) PCT Filed: Jun. 8, 2022

(86) PCT No.: PCT/JP2022/023169
§ 371 (c)(1),
(2) Date: Dec. 6, 2023

(87) PCT Pub. No.: WO2022/260097
PCT Pub. Date: Dec. 15, 2022

(65) Prior Publication Data
US 2024/0267091 A1 Aug. 8, 2024

(30) Foreign Application Priority Data
Jun. 11, 2021 (JP) .................. 2021-097775

(51) Int. Cl.
*H04B 7/0413* (2017.01)
(52) U.S. Cl.
CPC .................. *H04B 7/0413* (2013.01)
(58) Field of Classification Search
CPC .................................................. H04B 7/0413
See application file for complete search history.

(56) References Cited

U.S. PATENT DOCUMENTS

| 12,143,195 B1* | 11/2024 | Ismail ..................... H04W 4/80 |
| 2006/0285616 A1* | 12/2006 | Yen ........................ H04L 7/0062 |
| | | 375/355 |
| 2017/0099608 A1* | 4/2017 | Lam ....................... H04B 1/16 |

FOREIGN PATENT DOCUMENTS

| JP | 2017-38194 A | 2/2017 |
| JP | 2018-19384 A | 2/2018 |

(Continued)

OTHER PUBLICATIONS

T. Murakami et al., "Proposal of Virtual Massive MIMO (VM-MIMO).", IEICE, p. 123, 2019.

(Continued)

*Primary Examiner* — Janice N Tieu
(74) *Attorney, Agent, or Firm* — Blank Rome LLP

(57) ABSTRACT

A wireless communication device includes an antenna section configured to be provided with a plurality of antenna units that transmit and receive n communication signals having different directivities, a multiplexer configured to be connected to the antenna section, and n signal transmitting and receiving units configured to be connected to the multiplexer, to generate transmission signals, to demodulate reception signals, and to be provided corresponding to the n communication signals. The multiplexer switches connections between the antenna section and the n signal transmitting and receiving units in a time-division manner in a sampling period shorter than a period of a symbol of each of n reception signals to sequentially sample the n reception signals for each of the directivities at a time of reception. The antenna section sequentially receives divided reception signals obtained by dividing the reception signal corresponding to the directivity in the sampling period. Each of the signal transmitting and receiving units individually demodulates the reception signal corresponding to the divided reception signals that correspond to the directivity of (Continued)

the signal transmitting and receiving unit and have been sequentially acquired at a timing of the connection to the multiplexer.

7 Claims, 13 Drawing Sheets

(56) References Cited

FOREIGN PATENT DOCUMENTS

| | | |
|---|---|---|
| JP | 2020-141292 A | 9/2020 |
| JP | 2021-145210 A | 9/2021 |
| WO | 2022/038687 A1 | 2/2022 |
| WO | 2022/038689 A1 | 2/2022 |

OTHER PUBLICATIONS

S. Takahashi et al., "Study on Signal Selection by Blind Based Virtual Massive Array." IEICE Technical Report, vol. 120, No. 314, CQ2020-60, 2021.

International Search Report for Application No. PCT/JP2022/023169 dated Aug. 2, 2022.

\* cited by examiner (A) (B)

WIRELESS COMMUNICATION DEVICE AND WIRELESS COMMUNICATION METHOD

Priority is claimed on Japanese Patent Application No. 2021-097775, filed Jun. 11, 2021, the content of which is incorporated herein by reference.

BACKGROUND OF THE INVENTION

Technical Field

The present invention relates to a wireless communication device and a wireless communication method.

Background Art

In recent years, research has been conducted on fifth-generation (5G) communication for implementing high-speed and large-capacity communication. Until now, massive multiple input multiple output (MIMO) communication, which is an evolution of MIMO communication that enables high-speed and large-capacity communication, has been implemented. According to the Massive MIMO communication, a wireless base station can perform beam forming using a plurality of antennas to perform wireless communication with a plurality of mobile stations at the same time.

In order to transmit signals in a millimeter wave band over a long distance, it is necessary to perform beam forming having directivity with a phased array antenna using a large number of antennas. When the mass MIMO communication is implemented by the phased array antenna in the millimeter wave band, it is necessary to configure circuits corresponding to the number of MIMO streams for one antenna (see FIG. 15). In this case, in the phased array antenna in which the number of antennas is large in the mass MIMO communication, it is necessary to configure circuits corresponding to the number of streams as communication targets for each antenna, and there is a concern that a circuit configuration will be enormous with an increase in the number of antennas and that power consumption and costs will significantly increase.

T. Murakami et al., "Proposal of Virtual Massive MIMO (VM-MIMO)" 2019 IEICE General Conference 2019, B-1-123, Mar. 19, 2019 proposes Virtual Massive MIMO (VM-MIMO) in which a large number of antennas are virtually configured using a small number of antennas in order to reduce a circuit configuration in Massive MIMO communication. According to the technique disclosed in this document, high-speed sampling that switches a reception timing according to a plurality of directivities of a plurality of reception radio waves is performed such that the plurality of reception signals can be decoded. According to the disclosed technique, it is possible to make a small number of antennas function as a large number of virtual antennas. This document suggests a basic communication method, but does not propose a specific circuit configuration.

Japanese Patent Application, Publication No. 2020-141292 discloses a wireless communication device that changes the amplitude and phase of a reception signal a plurality of times in one symbol of the reception signal to output a plurality of reception signal patterns and combines the plurality of reception signal patterns output in the one symbol of the reception signal.

According to the technique disclosed in Japanese Patent Application, Publication No. 2020-141292, when the number of reception signals increases, there is a concern that a composite process will be complicated according to an increase in the number of samplings in one symbol of the reception signal. Further, this patent application publication discloses only a receiving method.

SUMMARY OF THE INVENTION

An object of the present invention is to provide a wireless communication device and a wireless communication method that can transmit and receive signals to and from a large number of mobile stations while simplifying a circuit configuration.

According to the present invention, there is provided a wireless communication device including: an antenna section configured to be provided with a plurality of antenna units that transmit and receive n communication signals having different directivities; a multiplexer configured to be connected to the antenna section; and n signal transmitting and receiving units configured to be connected to the multiplexer, to generate transmission signals, to demodulate reception signals, and to be provided corresponding to the n communication signals. The multiplexer switches connections between the antenna section and the n signal transmitting and receiving units in a time-division manner in a sampling period shorter than a period of a symbol of each of n reception signals to sequentially sample the n reception signals for each of the directivities at a time of reception. The antenna section sequentially receives divided reception signals obtained by dividing the reception signal corresponding to the directivity in the sampling period, and each of the signal transmitting and receiving units individually demodulates the reception signal corresponding to the divided reception signals that correspond to the directivity of the signal transmitting and receiving unit and have been sequentially acquired at a timing of the connection to the multiplexer.

According to the present invention, a plurality of communication signals are time-divided and sampled at the time of reception. Therefore, it is possible to share the antenna section and to simplify the configuration of the device.

In addition, in the present invention, the n signal transmitting and receiving units may generate n transmission signals according to the directivities at a time of transmission, and the multiplexer may sequentially sample the n transmission signals in a time-division manner in a sampling period shorter than a period of a symbol of the transmission signal, switch connections between the antenna section and the n signal transmitting and receiving units for a predetermined time at a timing of the sampling, and output divided transmission signals obtained by dividing the transmission signal to the antenna section according to the directivities at a timing of the connection to the signal transmitting and receiving unit. The antenna section may individually adjust phases of the plurality of antenna units, sequentially transmit the divided transmission signals in directions corresponding to the directivities, and transmit a plurality of the divided transmission signals for a predetermined time to individually transmit the n transmission signals.

According to the present invention, a plurality of communication signals are time-divided and sampled at the time of transmission. Therefore, it is possible to share the antenna section and to simplify the configuration of the device.

Further, in the present invention, the antenna section may include a first antenna section configured to transmit and receive a horizontally polarized wave in a polarization plane in a beam direction of the communication signal and a second antenna section configured to transmit and receive a vertically polarized wave orthogonal to the horizontally polarized wave in the polarization plane and may transmit and receive the horizontally polarized wave and the vertically polarized wave. The multiplexer may include a first multiplexer configured to correspond to the horizontally polarized wave and a second multiplexer configured to correspond to the vertically polarized wave. The signal transmitting and receiving unit may include a first transmitting and receiving unit configured to demodulate the horizontally polarized wave corresponding to the reception signal and to generate the horizontally polarized wave corresponding to the transmission signal and a second transmitting and receiving unit configured to demodulate the vertically polarized wave corresponding to the reception signal and to generate the vertically polarized wave corresponding to the transmission signal.

According to the present invention, it is possible to configure the wireless communication device that transmits and receives the vertically polarized wave and the vertically polarized wave at the same time.

Furthermore, in the present invention, the antenna unit may include an antenna element configured to transmit and receive the n communication signals, an amplifier configured to be provided corresponding to the antenna element and to adjust a gain or an amplitude of the communication signal, and a phase adjustment unit configured to be provided corresponding to the amplifier and to adjust a phase of the communication signal according to the directivity.

According to the present invention, it is not necessary to configure circuits corresponding to the number of streams in the antenna unit, and it is possible to simplify the configuration of the device.

Moreover, in the present invention, the wireless communication device may further include: a first delay unit configured to be connected to the antenna unit and to adjust a duty ratio and a delay of a phase of the communication signal; and a second delay unit configured to be connected to the multiplexer and to adjust a duty ratio and a delay of a phase of the time-divided communication signal.

According to the present invention, it is possible to prevent interference of the transmission signal and the reception signal (communication signals) and to improve the transmission and reception accuracy of the transmission signal and the reception signal.

According to the present invention, there is provided a wireless communication method including: a step of receiving n reception signals having different directivities; a step of sequentially sampling the n reception signals in a time-division manner in a sampling period shorter than a period of a symbol of each of the reception signals; a step of sequentially acquiring divided reception signals obtained by dividing the reception signal corresponding to the directivity for a predetermined time at a timing of the sampling; and a step of individually demodulating the n reception signals on the basis of a plurality of the acquired divided reception signals.

According to the present invention, a plurality of reception signals are time-divided and sampled at the time of reception. Therefore, it is possible to receive the plurality of reception signals substantially at the same time.

Further, in the present invention, the wireless communication method may further include: a step of generating n transmission signals according to the directivities at a time of transmission; a step of sequentially sampling the n transmission signals in a time-division manner in a sampling period shorter than a period of a symbol of the transmission signal; a step of outputting divided transmission signals obtained by dividing the transmission signal according to the directivities at a timing of the sampling; and a step of individually adjusting phases of a plurality of the divided transmission signals, sequentially transmitting the divided transmission signals in directions corresponding to the directivities, and transmitting the plurality of divided transmission signals for a predetermined time to individually transmit the n transmission signals.

According to the present invention, a plurality of transmission signals are time-divided and sampled at the time of transmission. Therefore, it is possible to transmit the plurality of transmission signals substantially at the same time.

Advantageous Effects of Invention

It is possible to transmit and receive signals to and from a large number of mobile stations while simplifying a circuit configuration.

DETAIL DESCRIPTION OF THE EMBODIMENTS

Figure 1:
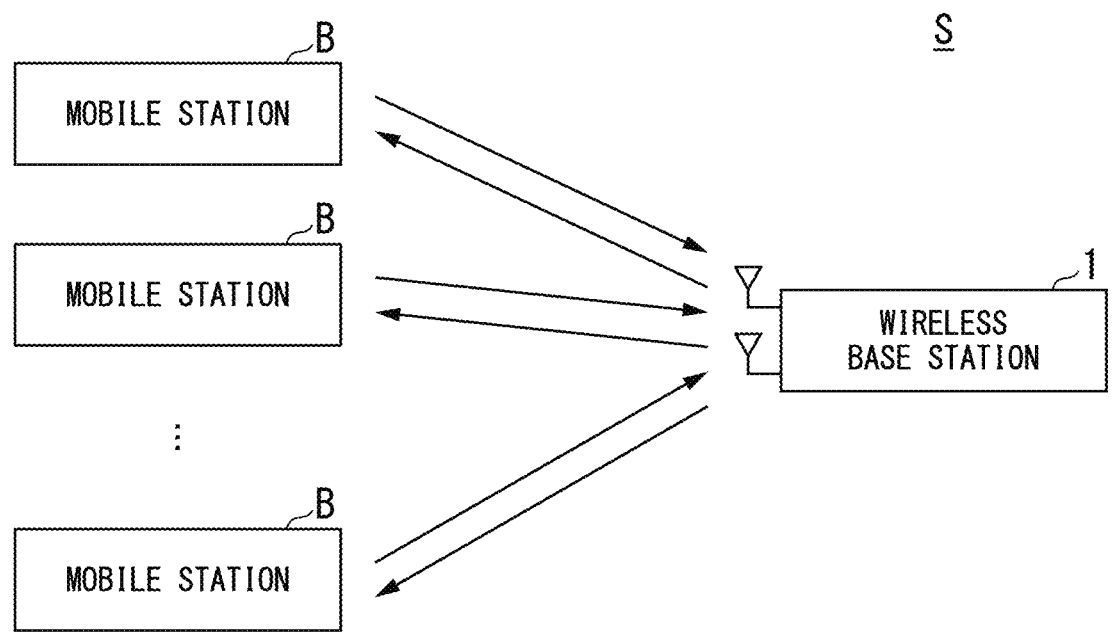
FIG. 1 is a diagram showing a configuration of a wireless communication system to which a wireless communication device according to an embodiment of the present invention is applied.

As shown in FIG. 1, a wireless communication system S enables simultaneous communication between a wireless communication device 1 and a plurality of mobile stations B.

The wireless communication device 1 performs beam forming to individually transmit a plurality of transmission signals to the plurality of mobile stations B, using a phased array antenna having a large number of antenna elements. In addition, the wireless communication device 1 individually receives a plurality of reception signals by giving directivities to the reception signals coming from the plurality of mobile stations B and receiving the reception signals using the phased array antenna.

Figure 2:
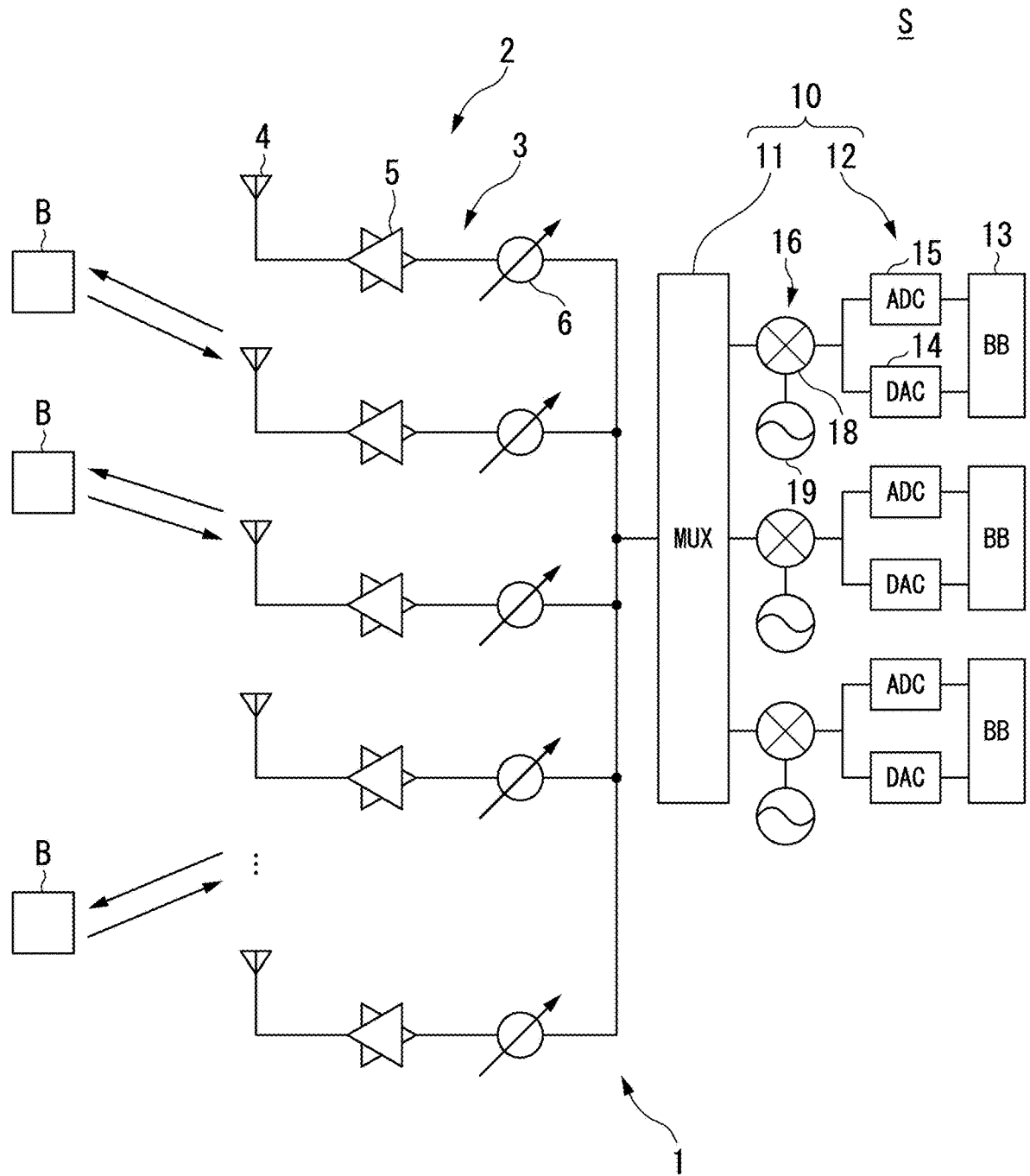
FIG. 2 is a diagram schematically showing a configuration of the wireless communication device.

As shown in FIG. 2, for example, the wireless communication device 1 is a communication device that is configured by a full digital phased array antenna applied to the wireless communication system S. For example, the wireless communication device 1 is a base station for a mobile communication network, a wireless LAN, or the like. The wireless communication device 1 includes, for example, an antenna section 2 that is provided with a plurality of antenna units 3 and a transmitting and receiving unit 10 that transmits and receives communication signals for communication. The antenna section 2 is a phased array antenna configured by the plurality of antenna units 3. For example, m antenna units 3 (m is a natural number) are provided.

The antenna section 2 transmits and receives communication signals in a millimeter wave band to and from, for example, n (n is a natural number) mobile stations B. The antenna section 2 adjusts the directivity of the communication signal to the position of each mobile station and transmits and receives n communication signals having different directivities. In the antenna section 2, m antenna elements 4 are disposed in a matrix on a two-dimensional plane.

The antenna unit 3 includes, for example, the antenna element 4 that transmits and receives the communication signal to and from the mobile station B, an amplifier 5 that is connected to the antenna element 4, and a phase adjustment unit 6 that is connected to the amplifier 5. The antenna element 4 transmits and receives n communication signals to and from the n mobile stations B. That is, the antenna element 4 can perform communication with n streams.

For example, one amplifier 5 is provided corresponding to one antenna element 4. The amplifier 5 adjusts the gain or amplitude of the communication signal in transmission and reception. For example, the amplifier 5 is formed by one circuit for transmission and reception. The amplifier 5 for transmission and the amplifier 5 for reception may be separately provided.

For example, one phase adjustment unit 6 is provided corresponding to one amplifier 5. The phase adjustment unit 6 adjusts the phase of the communication signal in transmission and reception. In the antenna section 2, the phases of the communication signals transmitted and received by adjacent antenna units 3 are adjusted to provide a phase difference. At the time of transmission, the antenna section 2 transmits a beam-formed transmission signal corresponding to the position of the mobile station B. At the time of reception, directivity can be given to the reception sensitivity of the reception signal according to the arrival direction of the transmission signal transmitted from the mobile station B. The plurality of phase adjustment units 6 are connected to the transmitting and receiving unit 10.

The transmitting and receiving unit 10 includes, for example, a multiplexer 11 that is connected to the antenna section 2 and n signal transmitting and receiving units 12 that are connected to the multiplexer 11. The multiplexer 11 switches, for example, connections between the antenna section and the n signal transmitting and receiving units at the time of transmission and reception. Further, n signal transmitting and receiving units 12 are provided corresponding to n communication signals. The signal transmitting and receiving unit 12 generates a transmission signal to communicate with the mobile station B and demodulates the reception signal.

The signal transmitting and receiving unit 12 includes, for example, a baseband circuit 13 that generates an actual signal of the transmission signal and decodes the reception signal, a DA conversion unit 14 that performs DA conversion on the generated transmission signal, an AD conversion unit 15 that performs AD conversion on the received reception signal, and a frequency conversion unit 16 that converts the frequency of the communication signal including the transmission signal and the reception signal. The frequency conversion unit 16 includes a mixer 18 that converts the frequency of the communication signal and a local oscillator 19 that generates a sine wave having the frequency of the communication signal. Two mixers 18 for transmission and reception may be provided independently. That is, the mixer 18 may be provided individually in each of the DA conversion unit 14 and the AD conversion unit 15.

Hereinafter, an operation of the wireless communication device 1 will be described. For example, the wireless communication device 1 communicates with n mobile stations B at the same time. First, the operation of the wireless communication device 1 receiving the reception signals from the n mobile stations B will be described.

Figure 3:
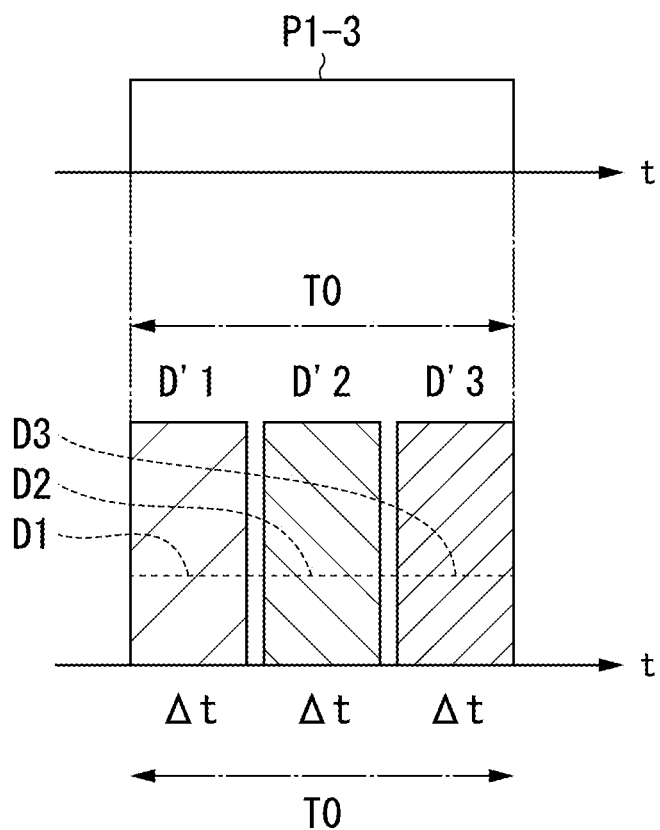
FIG. 3 is a diagram showing sampling of a communication signal.

As shown in FIG. 3, for example, one symbol Pn of each of n reception signals arrives at the antenna section 2. The one symbol is a signal that is set on the basis of a predetermined modulation method and indicates 0 or 1. During reception, at a switching timing of the multiplexer 11, the antenna section 2 time-divides the symbols in a sampling period ($\Delta t$) of a time slot that is shorter than a period (T0) of the symbol Pn of each of the n reception signals and sequentially receives the symbols Pn of the reception signals, which will be described below. The sampling period is, for example, $1/n \times T0$. The sampling period may be set to be slightly shorter than $1/n \times T0$ in order to prevent overlap. In addition, the sampling period may be lengthened in a direction in which the reception power of the reception signal is weak. That is, the length of the sampling period may be adjusted in inverse proportion to the intensity of the reception power. In the example in FIG. 3, the sampling period is set to, for example, about $\frac{1}{3} \times T0$ which is shorter than the period of the symbol Pn. The sampling period is set by being assigned to a predetermined phase difference of 0°, 30°, 60°, 90°, or the like. The sampling period may be set to other periods.

In the example shown in the drawings, a divided transmission signal D1 obtained by time-dividing and receiving a symbol P1 is received in a first time slot. A divided transmission signal D2 obtained by time-dividing and receiving a symbol P2 is received in a second time slot. A divided transmission signal D3 obtained by time-dividing and receiving a symbol P3 is received in a third time slot.

In each antenna unit 3, at the time of reception, the phase adjustment unit 6 adjusts the directivity such that reception sensitivity in the arrival direction of each of the n reception signals increases. For example, the directivity may be adjusted stepwise and periodically at each predetermined angle of 30° or the like. The directivity may be adjusted not only in a two-dimensional direction but also in a three-dimensional direction. In the example shown in FIG. 3, when each of the antenna units 3 receives divided reception signals, the amplifier 5 triples the power of the divided reception signals according to the sampling period, and amplified divided reception signals D'1 to D'3 are obtained.

The multiplexer 11 operates in operative association with the antenna section 2. The multiplexer 11 switches the connections between the antenna section 2 and the n signal transmitting and receiving units 12 in a time-division manner in the sampling period that is shorter than the period of the symbol of each of the n reception signals. Since the antenna section 2 sequentially receives the reception signal corresponding to directivity at the switching timing of the multiplexer 11, it is not necessary to provide circuit configurations corresponding to the number of streams. At the switching timing of the multiplexer 11, the antenna section 2 receives n divided reception signals Dn corresponding to the directivities of the n reception signals. The amplifier 5 amplifies the power of the divided reception signals Dn n times to generate divided reception signals D'n. The divided reception signals D'n are sequentially input to the signal transmitting and receiving units 12 and then sampled.

Each signal transmitting and receiving unit 12 sequentially acquires the divided reception signals D'n corresponding to its directivity at the timing of connection to the multiplexer 11. Each signal transmitting and receiving unit 12 acquires a plurality of divided reception signals for a predetermined time. Each signal transmitting and receiving unit 12 individually demodulates the reception signal on the basis of on the plurality of acquired divided reception signals. Each signal transmitting and receiving unit 12 can remove reception signals having other directivities on the basis of an S/N ratio of the reception signal, which is set according to the directivity, and recognize the divided reception signal according the directivity. The plurality of signal transmitting and receiving units 12 demodulate the n reception signals on the basis of the above-described process.

When transmitting the transmission signal, the wireless communication device 1 performs a process opposite to the process at the time of reception. The n signal transmitting and receiving units 12 that are provided according to the number of streams generate n transmission signals according to the directivity at the time of transmission. The multiplexer 11 switches the connections between the antenna section 2 and the n signal transmitting and receiving units 12 in a time-division manner in the sampling period ΔT that is shorter than the period T0 of one symbol Pn of the transmission signal to sequentially sample the n transmission signals. The signal transmitting and receiving unit 12 outputs the divided transmission signal D1 obtained by dividing the transmission signal to the antenna section 2 according to directivity at the timing of the connection to the multiplexer 11.

The antenna section 2 individually adjusts the phases of the plurality of antenna units 3 in operative association with the switching timing of the multiplexer 11, amplifies the power of the divided transmission signals Dn, and sequentially transmits the divided transmission signals Dn in the directions corresponding to the directivities. The antenna section 2 individually transmits a plurality of divided transmission signals Dn for a predetermined time to transmit the n transmission signals.

Figure 4:
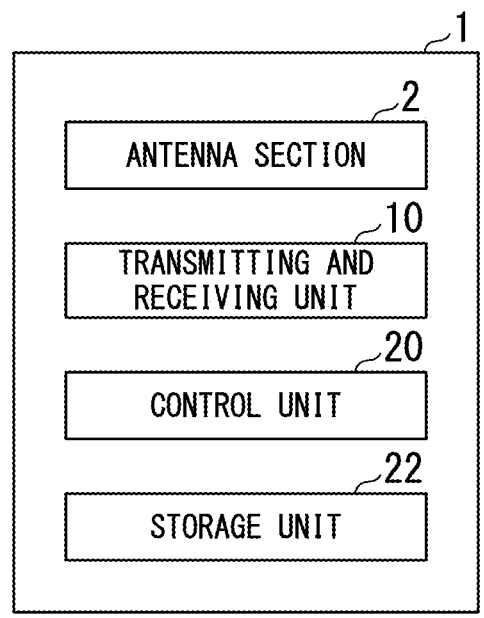
FIG. 4 is a block diagram showing the configuration of the wireless communication device.

As shown in FIG. 4, the antenna section 2 and the transmitting and receiving unit 10 include a control unit 20 and a storage unit 22 that stores data and a program used for control. For example, the control unit 20 controls the overall operation of the antenna section 2 and the transmitting and receiving unit 10 on the basis of the data and the program stored in the storage unit 22 to perform processes related to transmission and reception.

For example, a hardware processor, such as a central processing unit (CPU), executes a program (software) to implement the control unit 20. Some or all of these components may be implemented by hardware (circuit unit; including circuitry), such as a large scale integration (LSI), an application specific integrated circuit (ASIC), a field-programmable gate array (FPGA), or a graphics processing unit (GPU), or may be implemented by collaboration between software and hardware. In addition, the program may be stored in advance in a storage device, such as a hard disk drive (HDD) or a flash memory, included in the storage unit 22. Alternatively, the program may be stored in a removable storage medium, such as a DVD or a CD-ROM, and then installed by mounting the storage medium on a drive device. Further, the program is not necessarily provided, and the control unit 20 may configure a sequential circuit such that a predetermined operation is performed.

Hereinafter, each step of a process of a wireless communication method executed in the wireless communication device 1 will be described.

Figure 5:
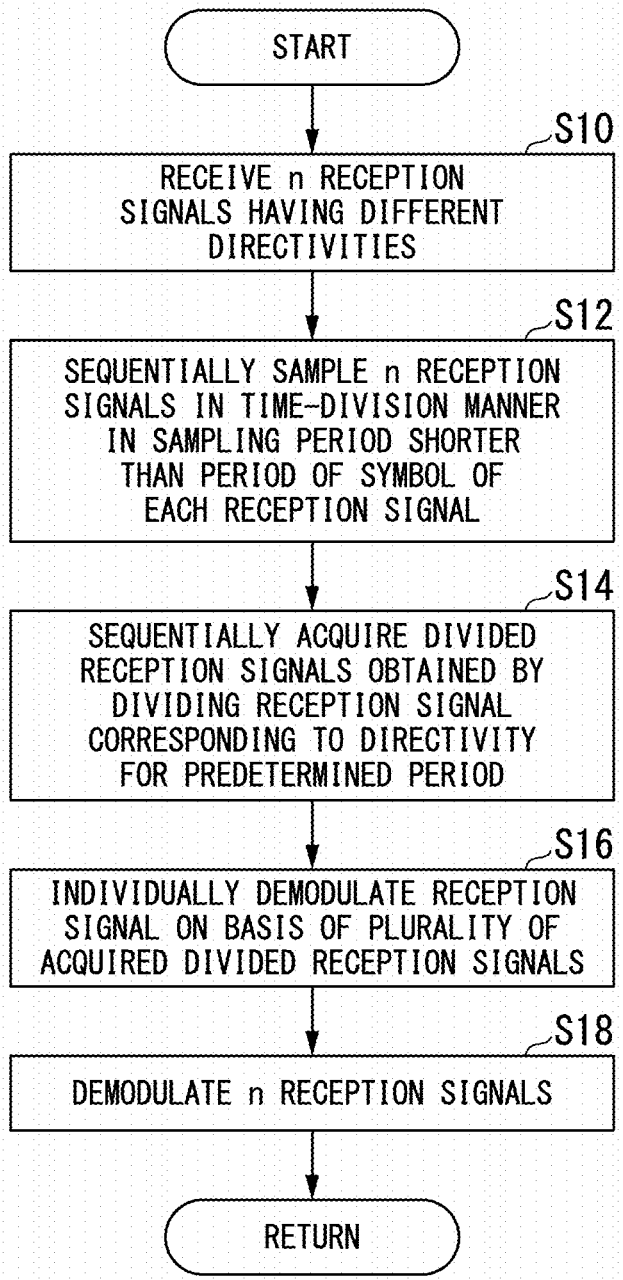
FIG. 5 is a flowchart showing a flow of a process of a wireless communication method at the time of reception.

As shown in FIG. 5, in a reception process of the wireless communication device 1, first, the antenna section receives n reception signals having different directivities (Step S10). In this case, n reception signals are sequentially sampled in a time-division manner in a sampling period shorter than the period of the symbol of each reception signal on the basis of the switching timing of the multiplexer 11 (Step S12). At the timing of the sampling, the signal transmitting and receiving unit 12 sequentially acquires the divided reception signals obtained by dividing the reception signal corresponding to the directivity for a predetermined time (Step S14). The signal transmitting and receiving unit 12 individually demodulates the reception signal on the basis of a plurality of acquired divided reception signals (Step S16). Then, the plurality of signal transmitting and receiving units 12 demodulate the n reception signals (Step S18).

Figure 6:
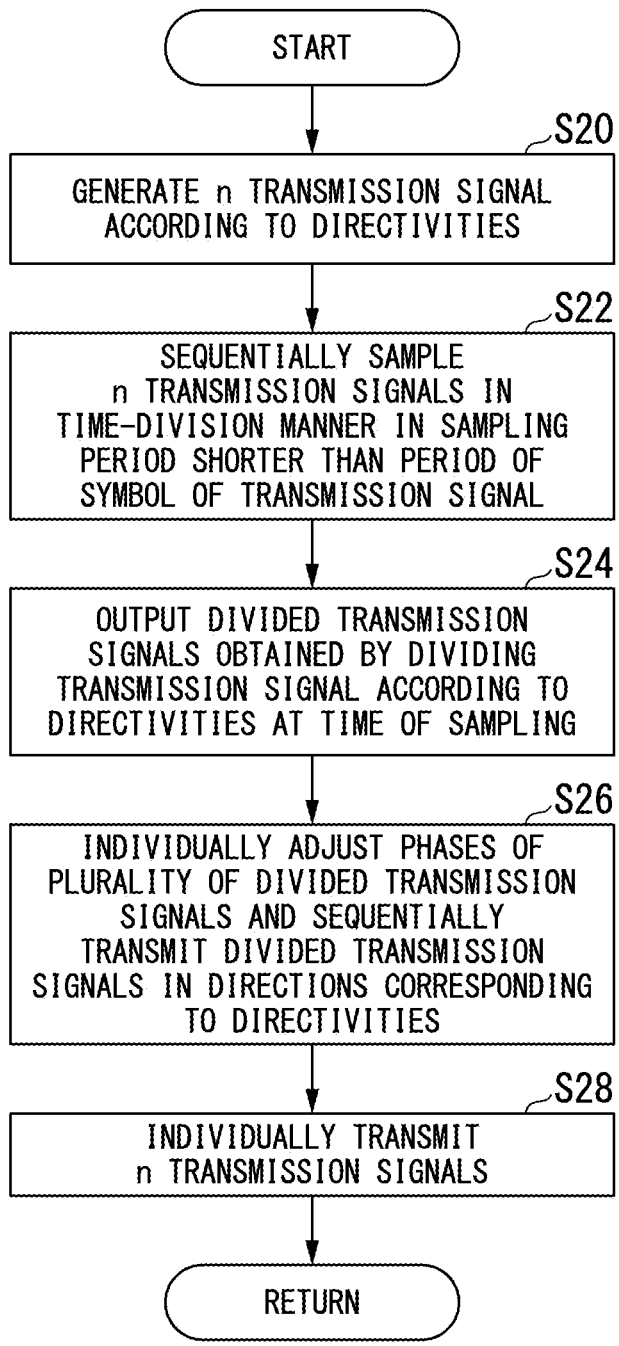
FIG. 6 is a flowchart showing a flow of a process of the wireless communication method at the time of transmission.

As shown in FIG. 6, in a transmission process of the wireless communication device 1, first, the n signal transmitting and receiving units 12 provided according to the number of streams generate n transmission signals according to the directivities (Step S20). The multiplexer 11 sequentially samples the n transmission signals in a time-division manner in the sampling period shorter than the period of the symbol of the transmission signal on the basis of the switching timing (Step S22). The n signal transmitting and receiving units 12 output the divided transmission signals obtained by dividing the transmission signal according to the directivities at the sampling timing (Step S24). The antenna section 2 individually adjusts the phases of a plurality of divided transmission signals and sequentially transmits the divided transmission signals in the directions corresponding to the directivities (Step S26). The antenna section 2 transmits the plurality of divided transmission signals for a predetermined time to individually transmit the n transmission signals (Step S28).

As described above, according to the wireless communication device 1, the n reception signals having different directivities are time-divided and sampled at a high speed, which makes it possible to demodulate the n reception signals substantially at the same time. According to the wireless communication device 1, it is possible to share the circuits of the antenna units 3 constituting the antenna section 2 on the basis of a fast switching process by the multiplexer 11 and thus to simplify and miniaturize the configuration of the device. According to the wireless communication device 1, the n transmission signals having different directivities are time-divided and sampled at a high speed, which makes it possible to transmit the n transmission signals substantially at the same time.

Figure 15:
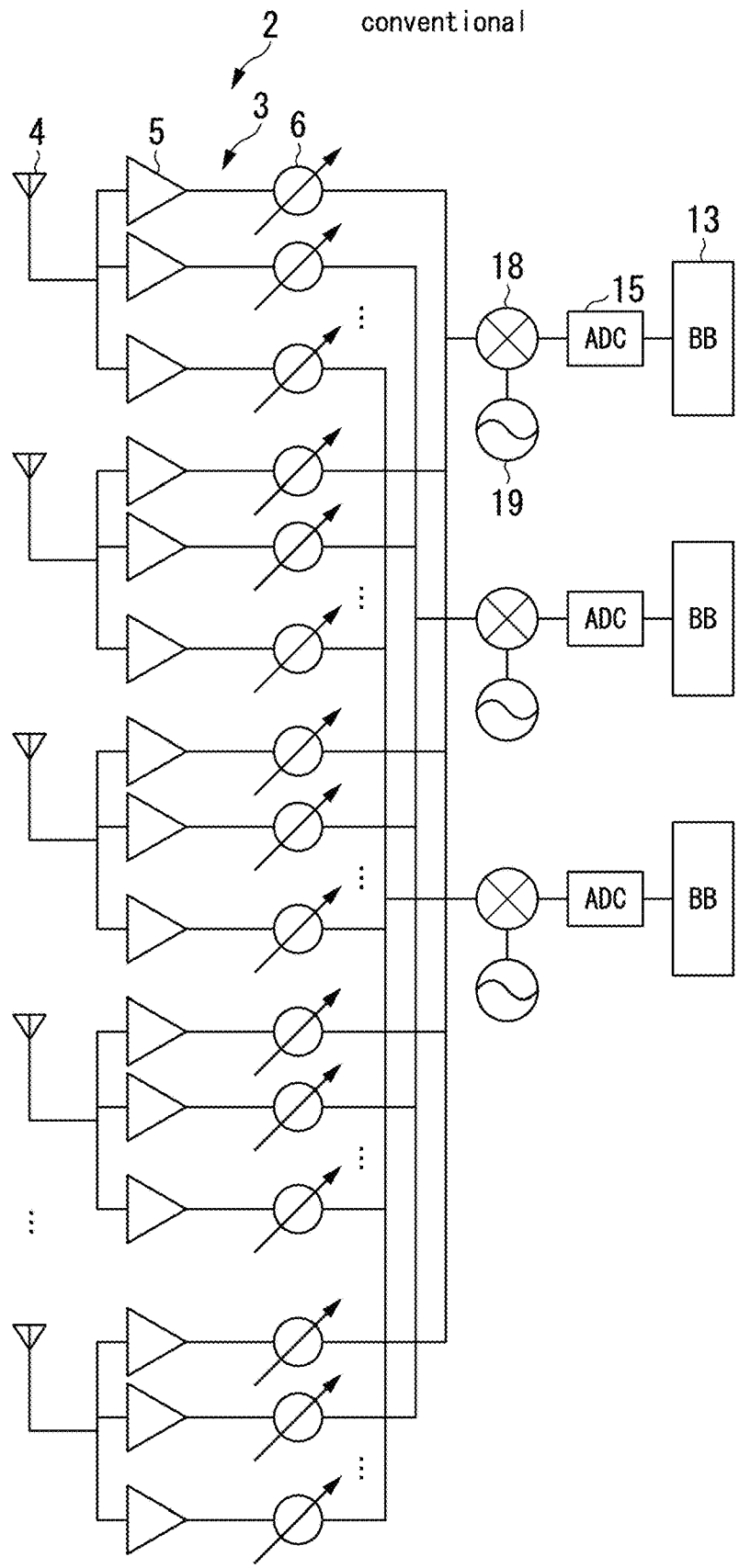
FIG. 15 is a diagram showing a configuration of a wireless communication device according to a comparative example.

According to the wireless communication device 1, the existing circuit can be applied to the signal transmitting and receiving unit 12 used for transmission and reception. Therefore, it is possible to simplify the design and to reduce a manufacturing cost. According to the wireless communication device 1, the sampling period is set to be shorter than the period of the symbol, which makes it possible to transmit and receive a plurality of signals substantially at the same time. In a wireless communication device (see FIG. 15) according to a comparative example, circuits corresponding to n streams are provided for each of m antenna units 3. Therefore, a circuit size is m×n. In contrast, the wireless communication device 1 can be composed of m circuits that are provided in each antenna unit 3 and n circuits in the transmitting and receiving units 10 corresponding to the number of streams and can have a circuit size of m+n.

Hereinafter, modification examples will be described. In the following description, the same configurations as those in the above-described embodiment have the same names and reference numerals, and redundant description thereof will be omitted.

Example 1

Figure 7:
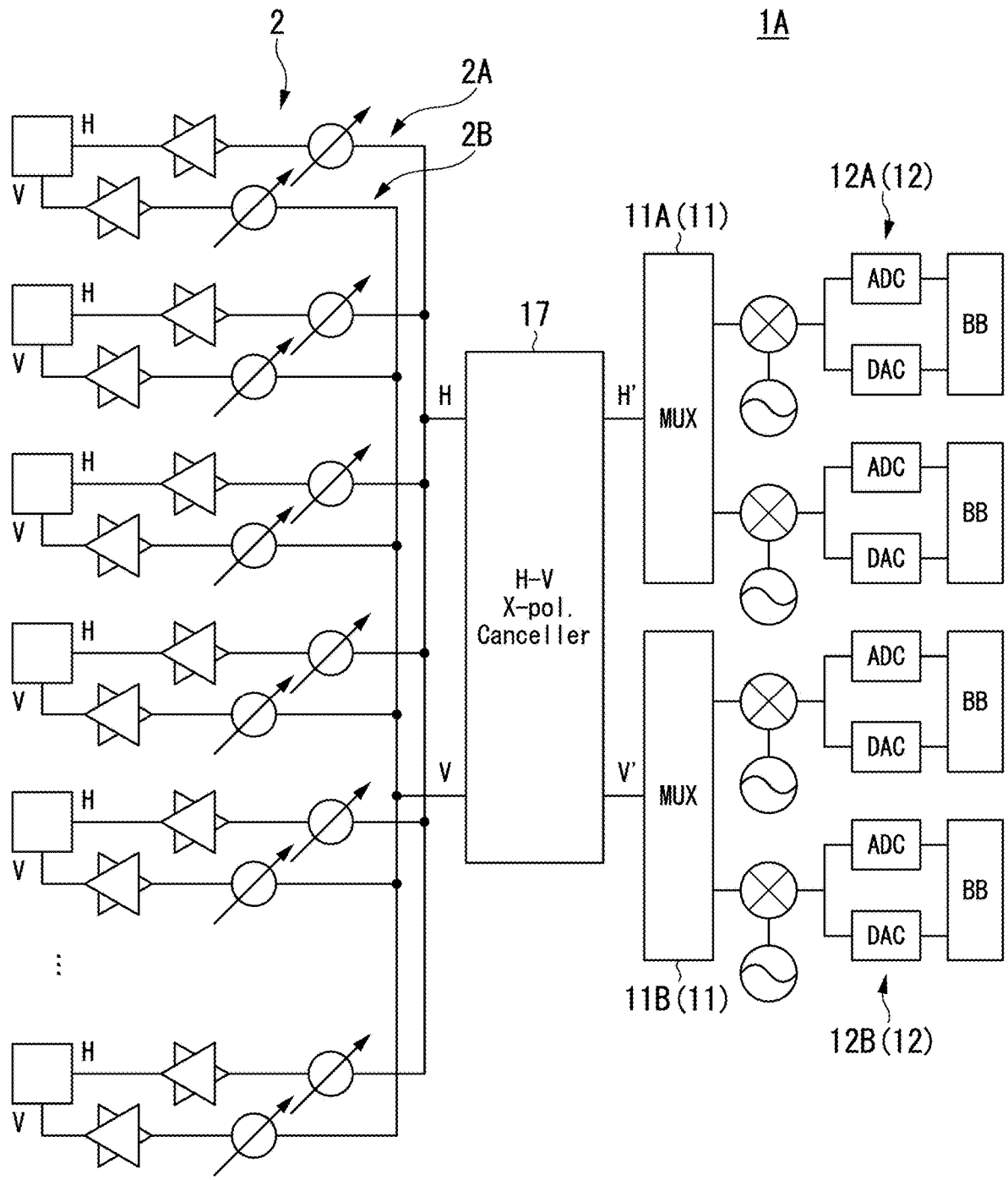
FIG. 7 is a diagram schematically showing a configuration of a wireless communication device according to Modification Example 1.

As shown in FIG. 7, a wireless communication device 1A is configured to generate a horizontally polarized wave and a vertically polarized wave that have the same frequency and have phases orthogonal to each other. An antenna section 2 includes a first antenna section 2A that transmits and receives the horizontally polarized wave and a second antenna section 2B that transmits and receives the vertically polarized wave orthogonal to the horizontally polarized wave in a polarization plane.

A multiplexer 11 includes a first multiplexer 11A corresponding to the horizontally polarized wave and a second multiplexer 11B corresponding to the vertically polarized wave. A cross polarization interference canceller 17 that reduces interference between polarized waves is provided between the multiplexer 11 and the antenna section 2. A signal transmitting and receiving unit 12 includes a first transmitting and receiving unit 12A that demodulates the horizontally polarized wave corresponding to the reception signal and generates the horizontally polarized wave corresponding to the transmission signal and a second transmitting and receiving unit 12B that demodulates the vertically polarized wave corresponding to the reception signal and generates the vertically polarized wave corresponding to the transmission signal.

According to the wireless communication device 1A, it is possible to simultaneously perform polarized MIMO communication with the horizontally polarized wave and the vertically polarized wave having phases orthogonal to each other, and it is possible to double a communication speed in the same frequency bandwidth. According to the wireless communication device 1A, the interference between polarized signals is cancelled in a wireless unit circuit. Therefore, it is possible to improve signal quality and to improve the communication speed.

Example 2

Figure 8:
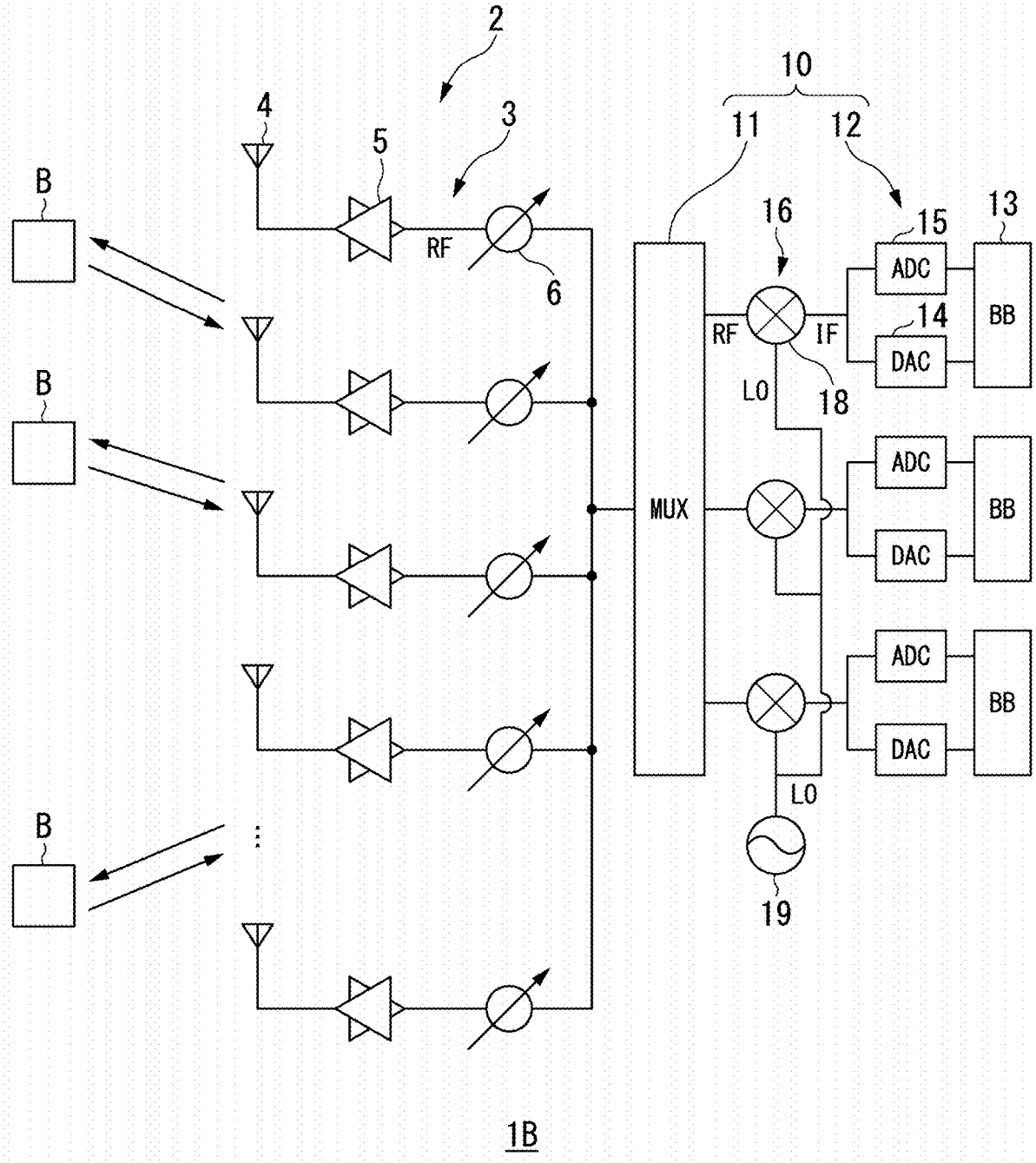
FIG. 8 is a diagram schematically showing a configuration of a wireless communication device according to Modification Example 2.

As shown in FIG. 8, similarly to the wireless communication devices 1 and 1A, a wireless communication device 1B is configured as an RF phase shifting type that changes a phase of a signal path of a reception signal of a radio frequency (RF)-modulated wave. The local oscillator 19 may be configured by one circuit that is individually connected to the mixer 18 provided in each antenna unit 3 (see FIG. 2) and is common to a plurality of mixers 18. In the wireless communication device 1, one local oscillator 19 is connected to the plurality of mixers 18. According to the wireless communication device 1B, since the common local oscillator 19 is used, it is possible to simplify a circuit configuration.

Example 3

For phase control in a high-frequency band, not only the RF phase shifting type that change the phase of the signal path of the radio frequency (RF)-modulated wave as in the wireless communication devices 1, 1A, and 1B (see FIGS. 2, 7, and 8) but also a local oscillator (LO) phase shifting type that changes the phase of the signal of the local oscillator 19 which is a carrier wave may be configured.

Figure 9:
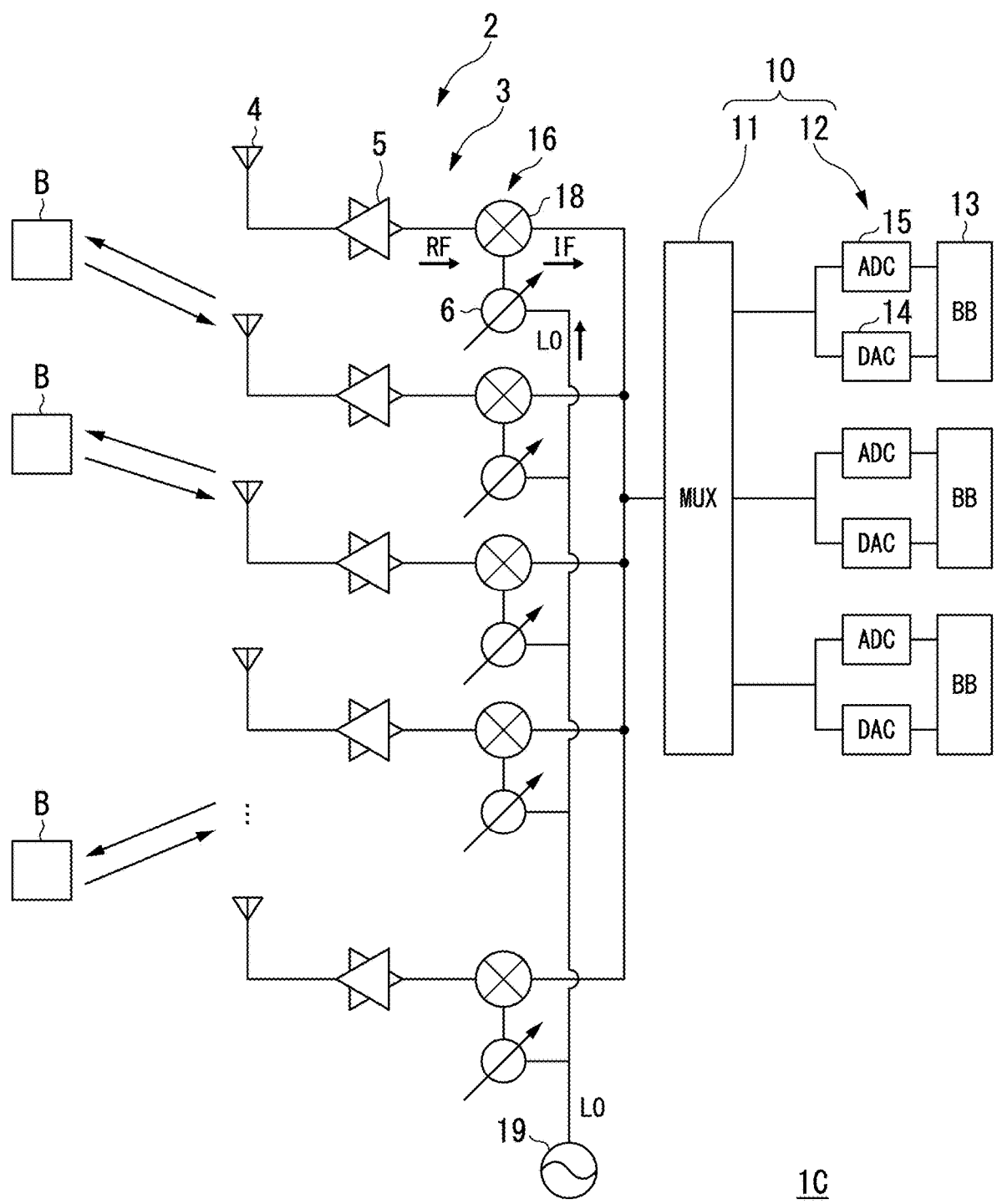
FIG. 9 is a diagram schematically showing a configuration of a wireless communication device according to Modification Example 3.

As shown in FIG. 9, a wireless communication device 1C is configured as the LO phase shifting type. In the wireless communication device 1C, for example, the frequency conversion unit 16 is connected to the amplifier 5 in each antenna unit 3. In each antenna unit 3, the frequency conversion unit 16 is configured to output an intermediate frequency (IF) signal obtained by converting an input RF signal. The frequency conversion unit 16 includes the mixer 18 and the phase adjustment unit 6 connected to the mixer 18. The local oscillator 19 is configured by one circuit that is common to the phase adjustment units 6 provided in each antenna unit 3.

Each phase adjustment unit 6 adjusts a phase of an LO signal generated by the local oscillator 19 and inputs the LO signal to the mixer 18. The mixer 18 inputs the received RF signal and outputs a low-frequency IF signal using the LO signal whose phase has been adjusted. In the wireless communication devices 1, 1A, and 1B configured by RF phase shifters, the phase adjustment unit 6 is provided in a signal path (4-5-6) of the RF signal. Thus, in the wireless communication devices 1, 1A, and 1B, there is a case where the gain fluctuates in the signal path due to a change in the phase and signal quality is degraded. In contrast, in the wireless communication device 1C configured by the LO phase shifter, the phase adjustment unit 6 is provided in a signal path (19-6-18) of the LO signal.

In the wireless communication device 1C, the phase adjustment unit 6 is not provided in a signal path (4-5-18) of the RF signal, and the gain does not fluctuate in the signal path of the RF signal. Therefore, according to the wireless communication device 1C, it is possible to maintain high signal quality and to improve a transmission speed. In addition, according to the wireless communication device 1C, since the common local oscillator 19 is used, it is possible to simplify the configuration of the device and to reduce a circuit area.

Example 4

Figure 10:
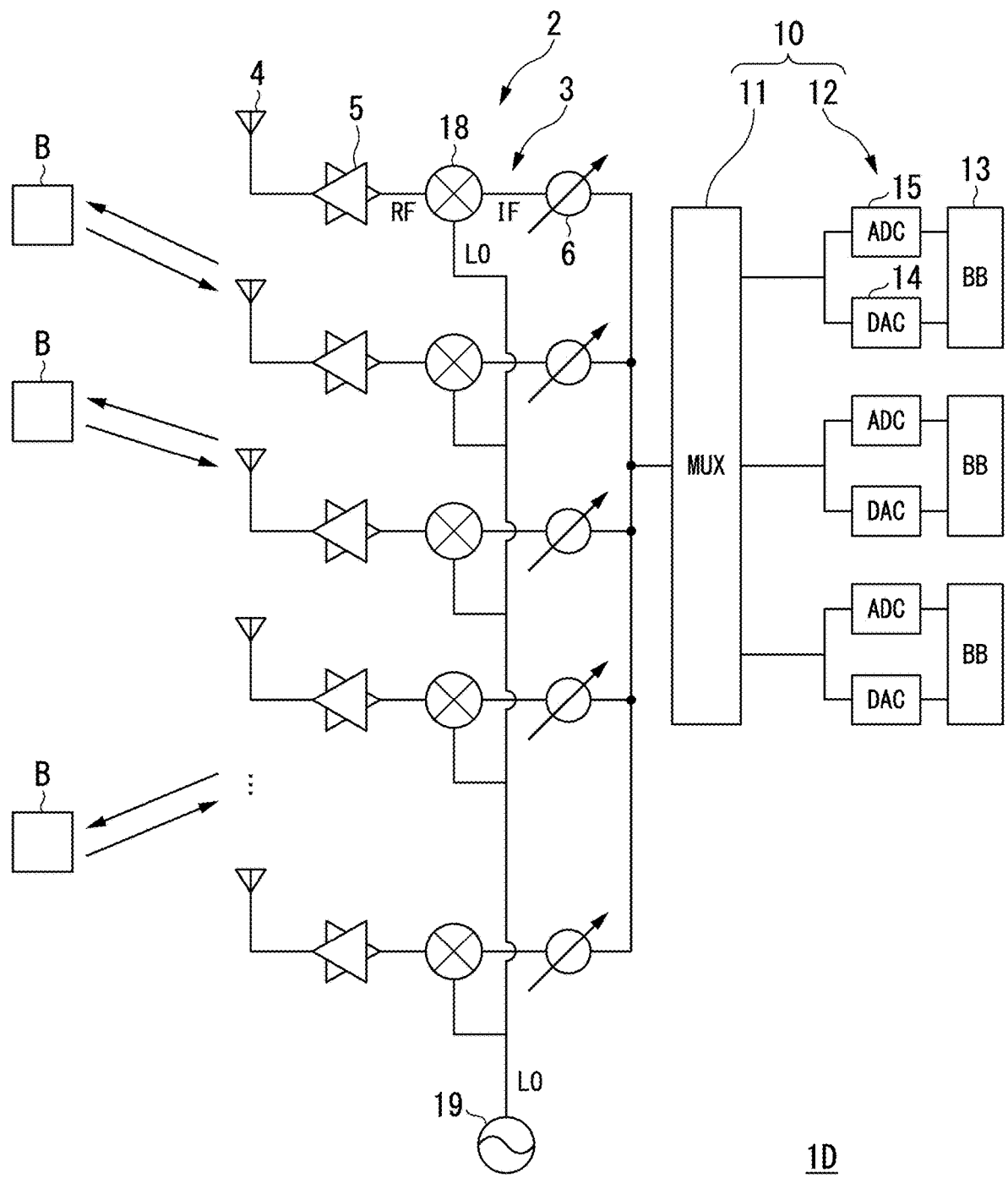
FIG. 10 is a diagram schematically showing a configuration of a wireless communication device according to Modification Example 4.

As shown in FIG. 10, a wireless communication device 1D is configured as the RF phase shifting type. In the wireless communication device 1D, the local oscillator 19 is configured by one circuit that is common to a plurality of mixers 18. Further, the wireless communication device 1D is configured to adjust the phase of the IF signal obtained by converting the RF signal. The phase adjustment unit 6 is connected to the mixers 18 in an RF signal path. According to the wireless communication device 1D, since the common local oscillator 19 is used, it is possible to simplify the configuration of the device and to reduce the circuit area.

Example 5

Figure 11:
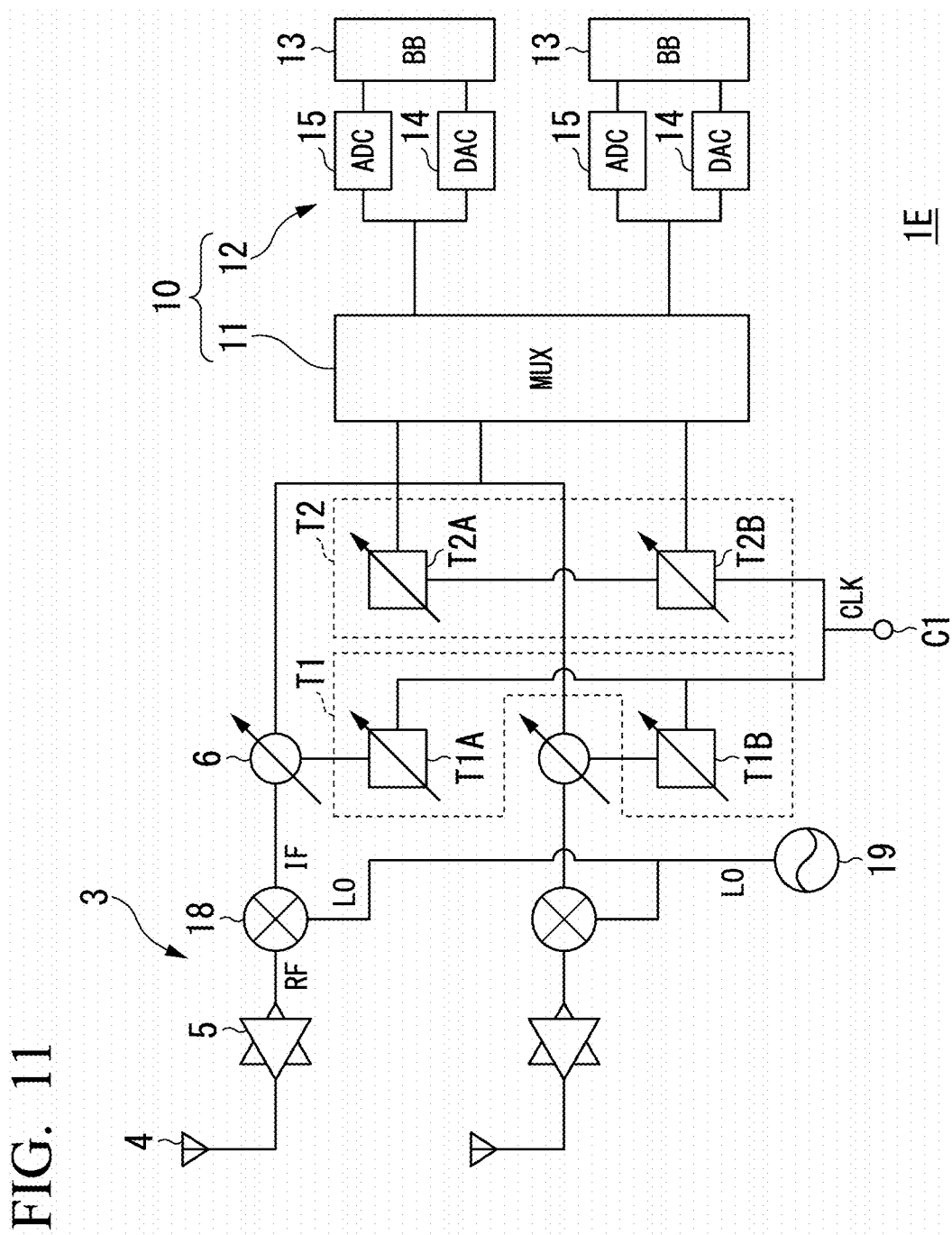
FIG. 11 is a diagram schematically showing a configuration of a wireless communication device according to Modification Example 5.

As shown in FIG. 11, a wireless communication device 1E is configured as the RF phase shifting type similarly to the wireless communication device 1D. In an example shown in FIG. 11, a configuration is simplified such that the number of antenna units is three and the number of streams of the transmitting and receiving unit 10 is two. However, the number of antenna units 3 can be expanded to m, and the number of streams of the transmitting and receiving unit 10 can be expanded to n. The wireless communication device 1E includes a first delay unit that is provided close to the phase adjustment unit 6 and a second delay unit T2 that is provided close to the T2 multiplexer 11. The first delay unit T1 and the second delay unit T2 are connected to a first clock input unit C1 to which a clock signal is input. The first delay unit T1 and the second delay unit T2 are controlled on the basis of a clock signal CLK.

The clock signal CLK is, for example, 1 GHz. The clock signal CLK is generated by an individual clock generation circuit (not shown). The clock signal CLK may be generated in operative association with the LO signal generated by the local oscillator 19. The clock of the LO signal is, for example, 24 GHz. In this case, the clock signal CLK may be generated by adjusting the frequency of the LO signal or may be generated by adjusting the frequency of the signal before being multiplied by the local oscillator 19.

The first delay unit T1 is configured by a non-overlapping clock circuit that prevents control based on the clock signals from being turned on at the same time. The first delay unit T1 can arbitrarily adjust the amount of delay and duty ratio of the input clock signal. For the first delay unit T1, for example, first delay circuits T1A and T1B may be individually provided for each of the phase adjustment units 6. More accurate phase adjustment can be performed by individually controlling the phase adjustment units 6 with the first delay circuits T1A and T1B. The amount of control in the first delay unit T1 may be a preset fixed value or may be arbitrarily controlled by the control unit 20.

The second delay unit T2 is configured by a non-overlapping clock circuit that prevents the overlap of the IF signal input to the multiplexer 11. The second delay unit T2 can arbitrarily adjust the duty ratio and the amount of delay of the phase of the IF signals corresponding to the number of streams which have been time-divided and input to the transmitting and receiving unit by the multiplexer 11. The second delay unit T2 may control the delay of the phase of the IF signal input to the transmitting and receiving unit 10 that is connected to the multiplexer 11 by one circuit. For example, for the second delay unit T2, second delay circuits T2A and T2B corresponding to the number of streams may be individually provided according to the transmitting and receiving unit 10 connected to the multiplexer 11. The second delay circuits T2A and T2B can individually control the duty ratio and the amount of delay of the phase of the IF signal input to the transmitting and receiving unit 10 to prevent the interference of signals of adjacent streams. The second delay circuit can adjust the rising timing and falling timing of the time-divided IF signal to adjust the duty ratio of the IF signal so as not to overlap with IF signals of adjacent streams. The amount of control in the second delay unit T2 may be a preset fixed value or may be arbitrarily controlled by the control unit 20.

Figure 12:
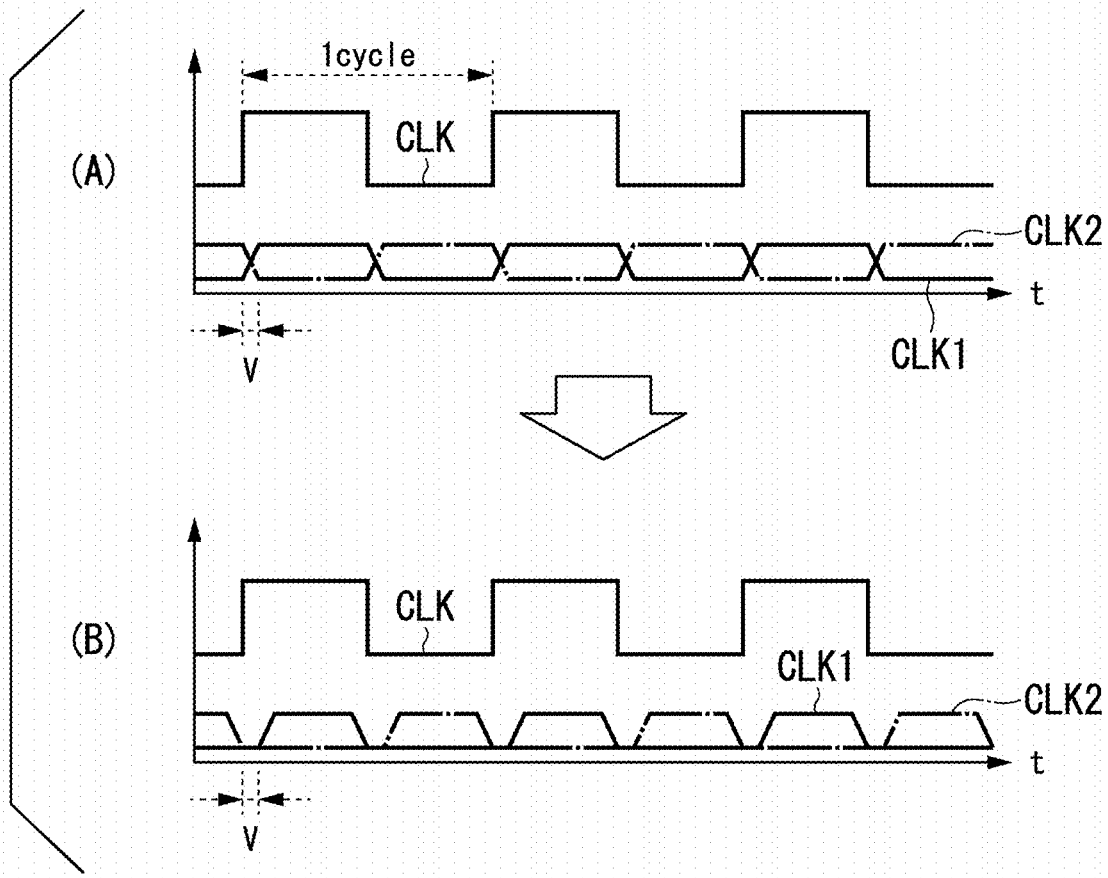
FIG. 12 is a diagram conceptually showing overlap of clock signals.

(A) of FIG. 12 shows a clock signal CLK input in a case where non-overlapping clock control is not performed and two clock signals in the transmitting and receiving units 10. In the transmitting and receiving unit 10, there is a case where an overlap section V between two clock signals CLK1 and CLK2 occurs due to the influence of the response time of the circuit. In the multiplexer 11, there is a case where IF signals of adjacent streams are input at the switching timing and reception accuracy is reduced. (B) of FIG. 12 shows clock signals CLK1 and CLK2 after the first delay unit T1 adjusts the overlap V. The use of the clock signals CLK1 and CLK2 adjusted by the first delay unit T1 makes it possible to prevent the interference of the IF signal input to the multiplexer 11.

Figure 13:
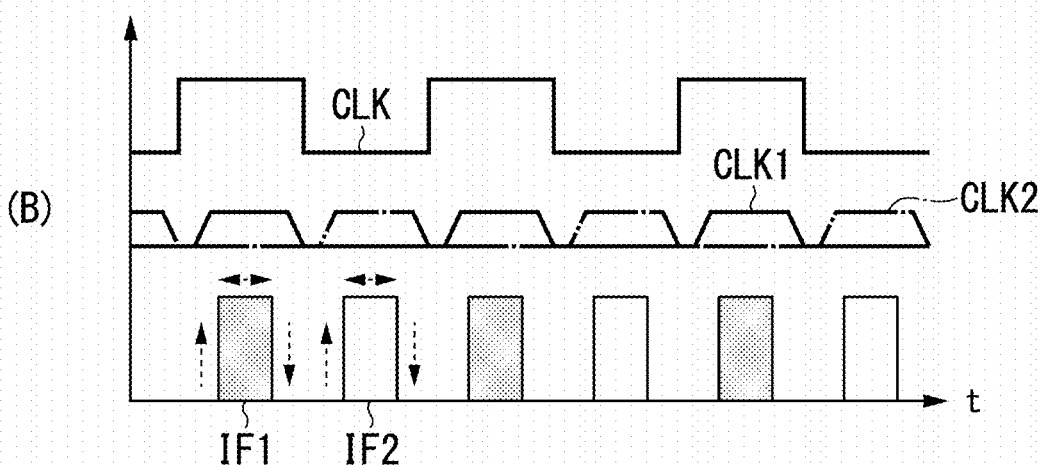
FIG. 13 is a diagram conceptually showing adjustment of a delay of phases of a clock signal and an IF signal.

As shown in FIG. 13, after the first delay unit T1 eliminates the overlap between the clock signals CLK1 and CLK2, the second delay unit T2 can arbitrarily adjust the duty ratio and the amount of delay of the phase of the IF signal input to the multiplexer 11. The second delay unit T2 can control the falling timing and falling timing of an IF signal IF1 input on the basis of the clock signal CLK1 to arbitrarily adjust the duty ratio and the amount of delay of the phase of the IF signal IF1. Similarly, the second delay unit T2 can control the falling timing and falling timing of an IF signal IF2 input on the basis of the clock signal CLK2 to arbitrarily adjust the duty ratio and the amount of delay of the phase of the IF signal IF1.

Figure 14:
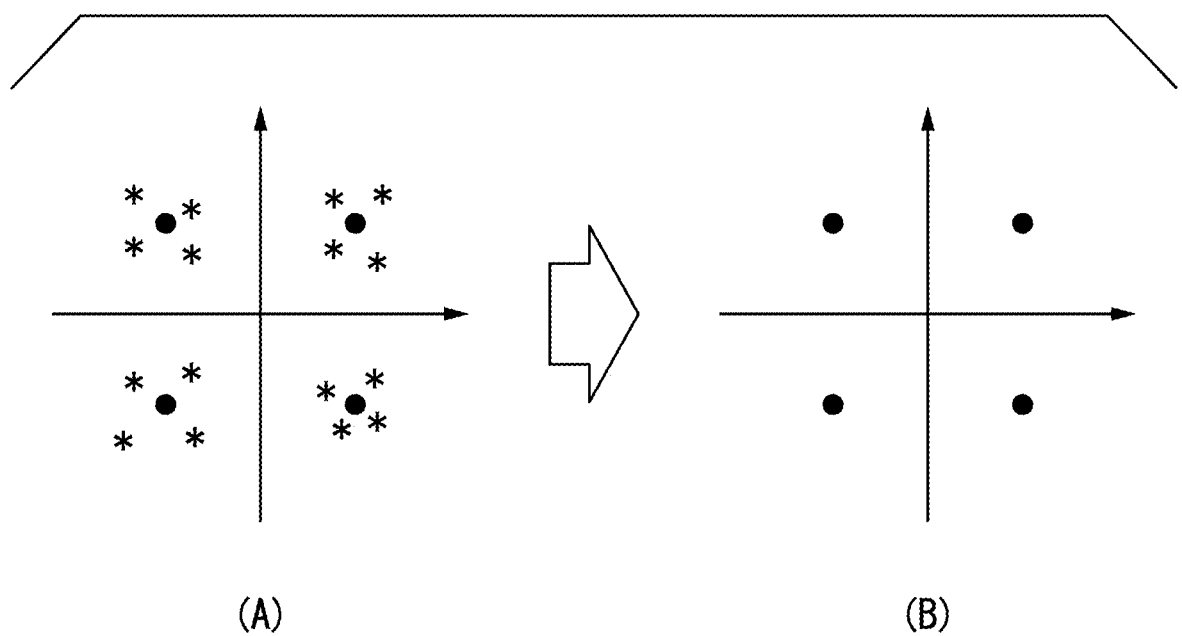
FIG. 14 is a diagram showing a state in which reception accuracy is improved on the basis of overlapping clock control.

As shown in (A) of FIG. 14, in a case where overlapping clock control is not performed, IF signals of adjacent streams may be input, and the reception accuracy of the reception signal may be reduced. As shown in (B) of FIG. 14, when the overlapping clock control is performed by the first delay unit T1 and the second delay unit T2, the input of the IF signals of adjacent streams is prevented, and the reception accuracy is improved. For the delay control in the first delay unit T1 and the second delay unit T2, control opposite to the reception control may be performed not only for the reception signal but also for the transmission signal. The first delay unit T1 and the second delay unit T2 can adjust any delay timing and the duty ratio (pulse width) of the transmission signal and the reception signal (communication signals). According to the first delay unit T1 and the second delay unit T2, it is possible to prevent the interference of the transmission signal and the reception signal and to improve the transmission and reception accuracy of the transmission signal and the reception signal.

Some embodiments of the present invention have been described above. However, these embodiments are presented as exemplary examples and are not intended to limit the scope of the present invention. These embodiments can be implemented in other various forms, and various omissions, replacements, and changes can be made without departing from the gist of the invention. These embodiments and the modifications thereof are included in the scope and gist of the invention as well as in the scope of the invention described in the claims and its equivalents. For example, the wireless communication device 1A may be configured such that the multiplexer 11 is provided in the antenna section 2 to time-divide the horizontally polarized wave and the vertically polarized wave. In addition, each configuration described in the wireless communication devices which are given as exemplary examples in the embodiments and each modification example may be replaced, changed, or added as appropriate.

REFERENCE SIGNS LIST 1 to 1E: Wireless communication device
Wireless communication device
2: Antenna section
2A: First antenna section
2B: Second antenna section
3: Antenna unit
4: Antenna element
5: Amplifier
6: Phase adjustment unit
10: Transmitting and receiving unit
11: Multiplexer
11A: First multiplexer
11B: Second multiplexer
12: Signal transmitting and receiving unit
12A: First transmitting and receiving unit
12B: Second transmitting and receiving unit
T1: First delay unit
T2: Second delay unit

The invention claimed is:

1. A wireless communication device comprising:
an antenna section configured to be provided with a plurality of antenna units that transmit and receive n communication signals having different directivities;
a multiplexer configured to be connected to the antenna section; and
n signal transmitting and receiving units configured to be connected to the multiplexer, to generate transmission signals, to demodulate reception signals, and to be provided corresponding to the n communication signals,
wherein the multiplexer switches connections between the antenna section and the n signal transmitting and receiving units in a time-division manner in a sampling period shorter than a period of a symbol of each of n reception signals to sequentially sample the n reception signals for each of the directivities at a time of reception,
the antenna section sequentially receives divided reception signals obtained by dividing the reception signal corresponding to the directivity in the sampling period, and
each of the signal transmitting and receiving units individually demodulates the reception signal corresponding to the divided reception signals that correspond to the directivity of the signal transmitting and receiving unit and have been sequentially acquired at a timing of the connection to the multiplexer.

2. The wireless communication device according to claim 1,
wherein the n signal transmitting and receiving units generate n transmission signals according to the directivities at a time of transmission,
the multiplexer sequentially samples the n transmission signals in a time-division manner in a sampling period shorter than a period of a symbol of the transmission signal, switches connections between the antenna section and the n signal transmitting and receiving units for a predetermined time at a timing of the sampling, and outputs divided transmission signals obtained by dividing the transmission signal to the antenna section according to the directivities at a timing of the connection to the signal transmitting and receiving unit, and
the antenna section individually adjusts phases of the plurality of antenna units, sequentially transmits the divided transmission signals in directions corresponding to the directivities, and transmits a plurality of the divided transmission signals for a predetermined time to individually transmit the n transmission signals.

3. The wireless communication device according to claim 1,
wherein the antenna section includes a first antenna section configured to transmit and receive a horizontally polarized wave in a polarization plane in a beam direction of the communication signal and a second antenna section configured to transmit and receive a vertically polarized wave orthogonal to the horizontally polarized wave in the polarization plane, and transmits and receives the horizontally polarized wave and the vertically polarized wave,
the multiplexer includes a first multiplexer configured to correspond to the horizontally polarized wave and a second multiplexer configured to correspond to the vertically polarized wave, and
the signal transmitting and receiving unit includes a first transmitting and receiving unit configured to demodulate the horizontally polarized wave corresponding to the reception signal and to generate the horizontally polarized wave corresponding to the transmission signal and a second transmitting and receiving unit configured to demodulate the vertically polarized wave corresponding to the reception signal and to generate the vertically polarized wave corresponding to the transmission signal.

4. The wireless communication device according to claim 1,
wherein the antenna unit includes an antenna element configured to transmit and receive the n communication signals, an amplifier configured to be provided corresponding to the antenna element and to adjust a gain or an amplitude of the communication signal, and a phase adjustment unit configured to be provided corresponding to the amplifier and to adjust a phase of the communication signal according to the directivity.

5. The wireless communication device according to claim 4, further comprising:
a first delay unit configured to be connected to the antenna unit and to adjust a duty ratio and a delay of a phase of the communication signal; and
a second delay unit configured to be connected to the multiplexer and to adjust a duty ratio and a delay of a phase of the time-divided communication signal.

6. A wireless communication method comprising:
a step of receiving n reception signals having different directivities;
a step of sequentially sampling the n reception signals in a time-division manner in a sampling period shorter than a period of a symbol of each of the reception signals;
a step of sequentially acquiring divided reception signals obtained by dividing the reception signal corresponding to the directivity for a predetermined time at a timing of the sampling; and
a step of individually demodulating the n reception signals on the basis of a plurality of the acquired divided reception signals.

7. The wireless communication method according to claim 6, further comprising:
a step of generating n transmission signals according to the directivities at a time of transmission;
a step of sequentially sampling the n transmission signals in a time-division manner in a sampling period shorter than a period of a symbol of the transmission signal;

a step of outputting divided transmission signals obtained by dividing the transmission signal according to the directivities at a timing of the sampling; and a step of individually adjusting phases of a plurality of the divided transmission signals, sequentially transmitting the divided transmission signals in directions corresponding to the directivities, and transmitting the plurality of divided transmission signals for a predetermined time to individually transmit the n transmission signals.

* * * * *